(12) United States Patent
Wen

(10) Patent No.: US 8,497,427 B2
(45) Date of Patent: Jul. 30, 2013

(54) SEGMENTED CABLE SHEATH WITH INNER SLEEVES

(76) Inventor: Yuan-Hung Wen, Chang Hua County (TW)

( * ) Notice: Subject to any disclaimer, the term of this patent is extended or adjusted under 35 U.S.C. 154(b) by 380 days.

(21) Appl. No.: 12/980,101

(22) Filed: Dec. 28, 2010

(65) Prior Publication Data

US 2012/0160537 A1    Jun. 28, 2012

(51) Int. Cl.
- H01B 7/18 (2006.01)
- H01B 9/02 (2006.01)
- F16C 1/28 (2006.01)
- F16C 1/10 (2006.01)

(52) U.S. Cl.
USPC ............. 174/102 R; 74/502.4; 74/502.5; 74/502.6

(58) Field of Classification Search
USPC ............. 174/102 R; 74/502.4, 502.5, 502.6
See application file for complete search history.

(56) References Cited

U.S. PATENT DOCUMENTS

| | | | | |
|---|---|---|---|---|
| 1,255,577 A * | 2/1918 | Berry | ............................. | 285/107 |
| 1,276,117 A * | 8/1918 | Riebe | ............................. | 464/171 |
| 2,424,863 A * | 7/1947 | Swain | ............................. | 138/129 |
| 3,290,429 A * | 12/1966 | Prescott et al. | ............ | 174/102 R |
| 3,546,961 A * | 12/1970 | Marton | ......................... | 74/502.5 |
| 3,858,578 A * | 1/1975 | Milo | .............................. | 600/229 |
| 5,199,320 A * | 4/1993 | Spease et al. | ................ | 74/502.4 |
| 5,899,425 A | 5/1999 | Corey, Jr. et al. | | |
| 6,250,175 B1 | 6/2001 | Noetzold | | |
| 6,502,496 B1 | 1/2003 | Ravid et al. | | |
| 6,606,921 B2 * | 8/2003 | Noetzold | ...................... | 74/502.3 |
| 6,648,376 B2 | 11/2003 | Christianson | | |
| 6,812,406 B2 * | 11/2004 | Hand | ............................ | 174/667 |
| 6,854,768 B2 * | 2/2005 | Elder | ......................... | 285/146.1 |
| 7,055,656 B2 * | 6/2006 | Drew | .......................... | 188/65.1 |
| 7,784,376 B2 * | 8/2010 | Wen | ............................. | 74/502.5 |
| 8,172,189 B2 * | 5/2012 | Wilson et al. | ............ | 248/288.31 |
| 2006/0179966 A1 * | 8/2006 | Kuo | .............................. | 74/502.5 |
| 2010/0326231 A1 * | 12/2010 | Kuo | .............................. | 74/502.5 |

* cited by examiner

*Primary Examiner* — Timothy Thompson
*Assistant Examiner* — Nathan Milakovich
(74) *Attorney, Agent, or Firm* — Muncy, Geissler, Olds & Lowe, PLLC

(57) ABSTRACT

A cable sheath of the present invention includes several adapter tubes which can be joined to one another. Each of the adapter tubes has a metal outer tube and a plastic inner tube. The plastic inner tube which is inserted into the metal outer tube abuts against the metal outer tube, so that the plastic inner tube of each of the adapter tubes can be used for receiving a metal cable therein. Thereby, said invention can receive a brake cable or the like without a plastic tube of the cable, so that said invention can prevent the cable from being wound by a remaining interior stress from the plastic tube.

9 Claims, 6 Drawing Sheets

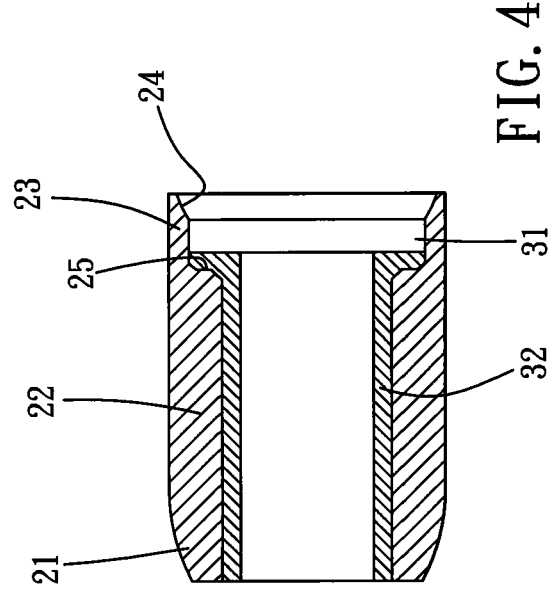
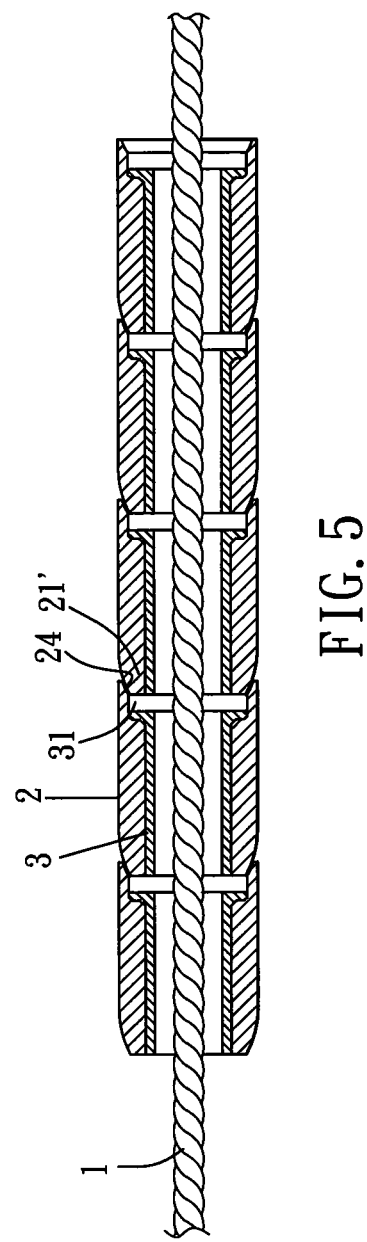
FIG. 4
FIG. 5

SEGMENTED CABLE SHEATH WITH INNER SLEEVES

BACKGROUND OF THE INVENTION

1. Field of the Invention

The present invention relates to a cable sheath, more particularly to a cable sheath for a cable which is used for transmitting a pull force.

2. Description of the Prior Art

A cable sheath is used for receiving a bicycle brake cable or the like cables therein so as to provide a protective effect to the cable or its user.

A conventional cable sheath, as shown in U.S. Pat. No. 6,250,175, is a plurality of tubes which are joined to one another so as to receive a metal cable and a plastic tube of a brake cable therein. However, the brake cable is easy to be randomly wound by a remaining interior stress of its plastic tube, so that the cable is hard to be retained at an ideal position by its user. Besides, its plastic tube may crumble into small pieces as its plastic material ages, so that the pieces may obstruct the movement of its metal cable and the sheath.

Another cable sheath, as described in U.S. Pat. No. 5,899,425, is used for directly receiving a cable therein. But as the sheath is made of metal, the metal cable rubs against the sheath directly. In this way, it will make noise or get stuck by each other when in use.

Another cable sheath with a similar structure, as shown in U.S. Pat. No. 6,502,496 has an inside part and an outside part. Said parts are made of different materials in different ways. Thereby it can prevent a cable in the inside part from being scratched by the outside part. However, an adhesive is required to be applied between the outside part and the inside part. And it is more complicated to produce and assemble said sheath.

Moreover, another cable sheath of U.S. Pat. No. 6,648,376 has a sleeve inside of it. However, only part of the sleeve abuts against the sheath, so that said sleeve is easy to be separated from the sheath. In the same time, the sleeve abuts another sheath which is adjacent to it, so that the flexible angle of a joint between two sheaths is limited.

The present invention is, therefore, arisen to obviate or at least mitigate the above mentioned disadvantages.

SUMMARY OF THE INVENTION

The main object of the present invention is to provide a cable sheath for receiving a metal cable of a bicycle brake cable or other like cables therein.

To achieve the above and other objects, a cable sheath of the present invention includes a plurality of adapter tubes. Each of the adapter tubes has a first end and a second end. Each of the adapter tubes comprises a metal outer tube and a plastic inner tube.

The metal outer tube is formed with a head section, an extension section, an abutting section, and an end section from the first end to the second end. An outer diameter of the head section is gradually contracted toward the first end. The extension and the head section have a same inner diameter. An inner diameter of the abutting section is larger than an inner diameter of the extension section. An inner diameter of the end section is gradually enlarged from the abutting section toward the second end.

The plastic inner tube has a fixed section and a protective section which extends from the fixed section. An outer diameter of the fixed section corresponds to the inner diameter of the abutting section. An outer diameter of the protective section corresponds to the inner diameter of the head section and the extension section. The plastic inner tube is inserted into the metal outer tube from the end section so as to make the fixed section abut against the abutting section.

Wherein, the end section of each of the adapter tubes is adapted to be abutted against by the head section of another adapter tube.

Thereby, the present invention is used for receiving a metal cable in the plastic inner tube of each of the adapter tubes. Said plastic inner tube can prevent the metal cable from being rubbed by the contact with the metal outer tube. Said invention further can prevent the metal cable from being randomly wound by a remaining interior stress of a plastic tube of the metal cable. Furthermore, said plastic inner tube is inserted into the metal outer tube so as to make itself preferably fixed in the metal outer tube.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 4 is a sectional drawing of an adapter tube of a cable sheath in accordance with an embodiment of the present invention;

FIG. 5 is a sectional drawing of a cable sheath in accordance with an embodiment of the present invention;

DETAILED DESCRIPTION OF THE PREFERRED EMBODIMENTS

Figure 1:
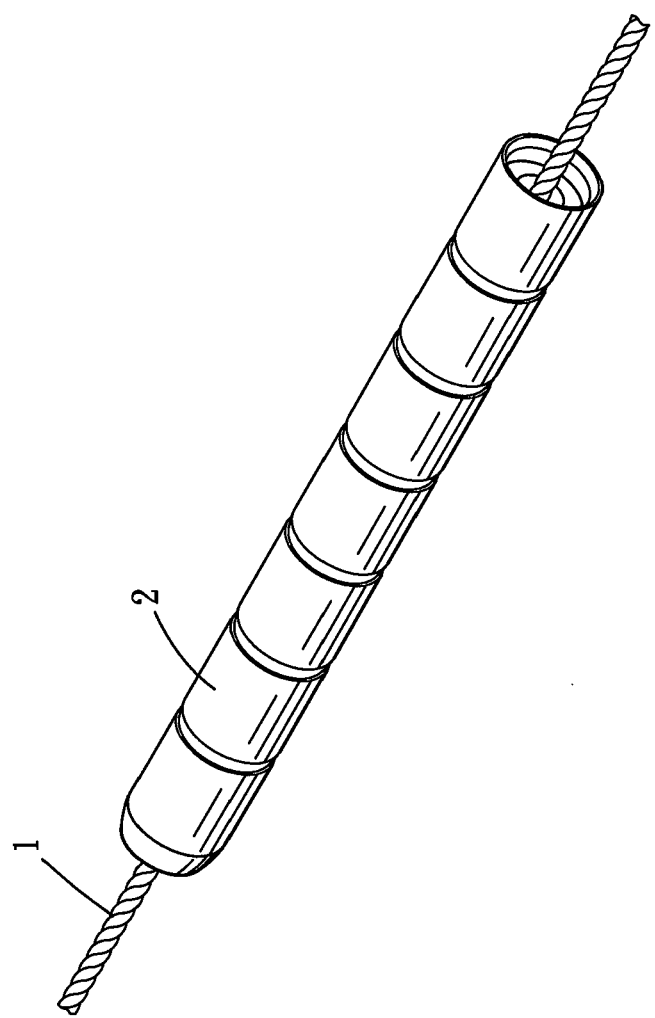
FIG. 1 is a perspective view of a cable sheath in accordance with an embodiment of the present invention.

Please refer to FIG. 1. An embodiment of the present invention provides a cable sheath which is formed with plural adapter tubes which are joined one another, so that the invention is adapted to receive a metal cable therein. Each of the adapter tubes has a first end and a second end.

Figure 3:
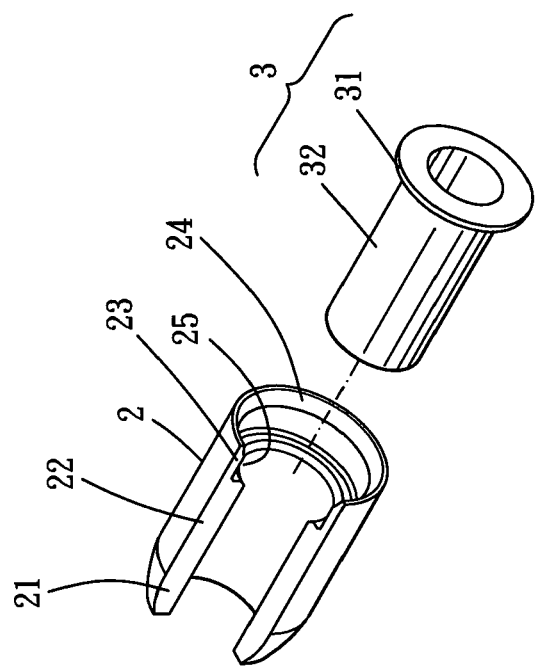
FIG. 3 is a breakdown drawing of an adapter tube of a cable sheath in accordance with an embodiment of the present invention.
Figure 2:
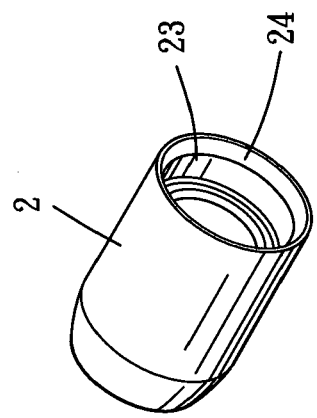
FIG. 2 is a perspective view of an adapter tube of a cable sheath in accordance with an embodiment of the present invention.
Figure 7:
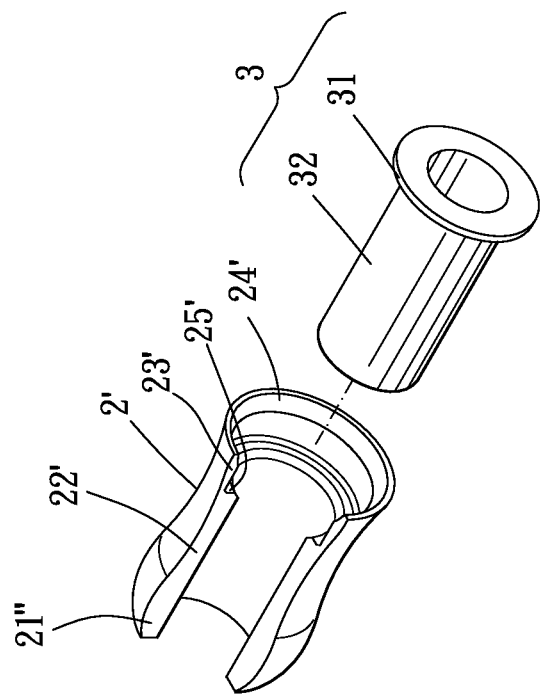
FIG. 7 is a breakdown drawing of an adapter tube of a cable sheath in accordance with another embodiment of the present invention.
Figure 6:
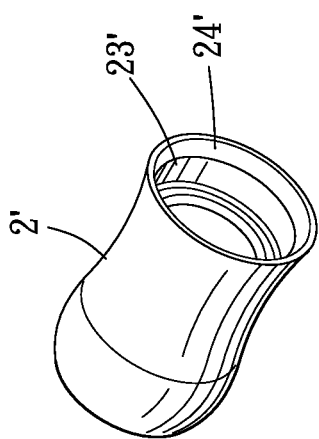
FIG. 6 is a perspective view of an adapter tube of a cable sheath in accordance with another embodiment of the present invention.
Figure 8:
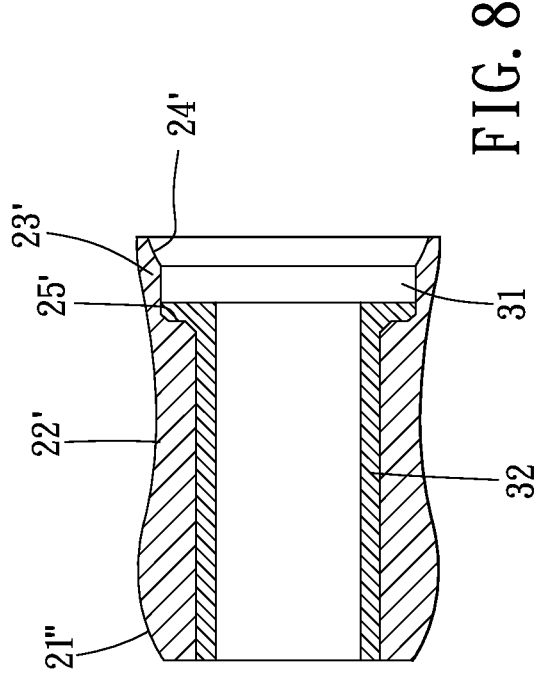
FIG. 8 is a sectional drawing of an adapter tube of a cable sheath in accordance with another embodiment of the present invention.
Figure 9:
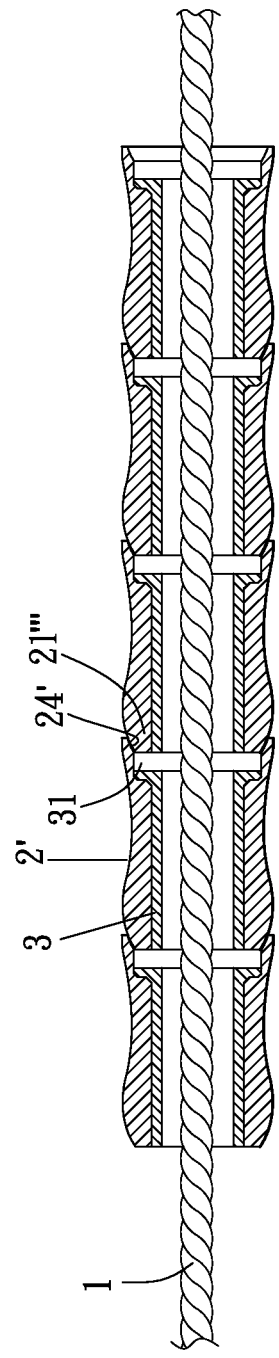
FIG. 9 is a sectional drawing of a cable sheath in accordance with an embodiment of the present invention.

Please refer to FIG. 2 to FIG. 4. Each of the adapter tubes includes a metal outer tube 2 and a plastic inner tube 3. The metal outer tube 2 can be made of copper, titanium, other metal or alloy of other metal. Wherein, the metal outer tube 2 is preferably to be made of aluminum or alloy of aluminum according to its processing characteristic and production cost.

The metal outer tube 2 is formed with a head section 21, an extension section 22, an abutting section 23 and an end section 24 from the first end to the second end.

An outer diameter of the head section 21 is gradually contracted toward the first end. An outer surface of the extension section 22, the abutting section 23 and the end section 24 is formed as a cylinder and extends to the second end. In other possible embodiments of the present invention, the head section 21 can be formed with an annular convex rib. The head section 21 and the extension section 22 have a same inner diameter. More specifically, the inner diameter of the head section 21 unchangeably extends to the inner diameter of the extension section 22. An inner diameter of the abutting section 23 is larger than the inner diameter of the extension section 22. A step surface 25 is formed between the abutting section 23 and the extension section 22. An inner diameter of the end section 24 is gradually enlarged from the abutting section 23 toward the second end. In the present embodiment, the head section 21 and the extension section 22 have the same diameter. In other possible embodiments of the present invention, the inner diameter of the extension section 22 and the head section 21 is gradually contracted toward the first end. Further, the inner diameter of the abutting section 23 can be gradually enlarged from the extension section 22 toward the end section 24.

The plastic inner tube 3 has a fixed section 31 and a protective section 32 which extends from the fixed section 31. An outer diameter of the fixed section 31 corresponds to an inner diameter of the abutting section 23. An outer diameter of the protective section 31 corresponds to the inner diameter of the head section 21 and the extension section 22 so as to allow the plastic inner tube 3 to be inserted into the metal outer tube 2 from the end section 24. In this way, the fixed section 31 can abut the abutting section 23 and the step surface 25. Preferably, an outer surface of the protective section 32 can fit an inner surface of the extension section 22 and the head section 21, and a distal end of the protective section 32 extends to the first end, so that the outer surface of the protective section 32 can match the inner surface of the extension section 22 and the head section 21. Furthermore, the outer diameter of the protective section 32 is gradually contracted toward the distal end of the protective section 32. Thereby, the plastic inner tube 3 is easy to be inserted into the metal outer tube 2. In other possible embodiments, the inner diameter of the abutting section 23 is gradually enlarged from the extension section 22 toward the end section 24, so that the metal outer tube 2 is formed without any step surface and the fixed section 31 can also directly abut against the abutting section 23.

Please refer to FIG. 5. The end section 24 of each of the above-mentioned adapter tubes can be inserted into by the head section 21' of another adapter tube. Consequently, the plastic inner tube 3 can be tightly fixed in the metal outer tube 2, and the cable sheath can then be formed with several adapter tubes which are joined one another. The plastic inner tubes in the cable sheath can receive the metal cable 1 therein. In other possible embodiments, as the head section is formed with the annular convex rib, the metal outer tube can further comprise a stuck section which extends from the end section 24, and the stuck section has a taper inner diameter so as to retain the head section 21' of another adapter tube in the end section 24. Thereby, the invention is adapted to directly receive the metal cable 1 therein without inserting the metal cable 1 into an additional plastic tube. Therefore, it can save the production cost for the brake cable and decrease a weight of the brake cable. More specifically, before using the brake cable, its user doesn't need to cut a plastic tube or insert the metal cable into the plastic tube. For this reason, it is more convenient to use and install the brake cable. Moreover, without the additional plastic tube, the present invention can prevent the metal cable from being randomly wound by a remaining interior stress of the plastic tube. Consequently, the metal cable received in the cable sheath doesn't wind randomly, so that its user can adjust the cable and remain it in a fixed position without an effect from the remaining interior stress.

In addition, each adapter tube of the present invention abuts against one another so as to form an unsealed tube. As rainwater (or other liquid) drops into the sheath, the rainwater can flow out between two of the joined adapter tubes rapidly. So the invention can drain liquid out of it.

Please refer to FIG. 6 to FIG. 9. In another embodiment of the present invention, an outer surface of the metal outer tube 2' can be formed as other shapes other than a cylindrical shape. More specifically, the outer diameter of the head section 21" is contracted toward the first end. The outer surface of the extension is annularly formed with an arc notch. An outer diameter of the abutting section 23' and the end section 24' is gradually enlarged toward the second end. Thereby, a thickness of the extension section 22' can be decreased so as to decrease a weight of the invention. A thickness of the abutting section 23' and the end section 24' is then increased so as to enhance the structural strength of the invention.

Figure 10:
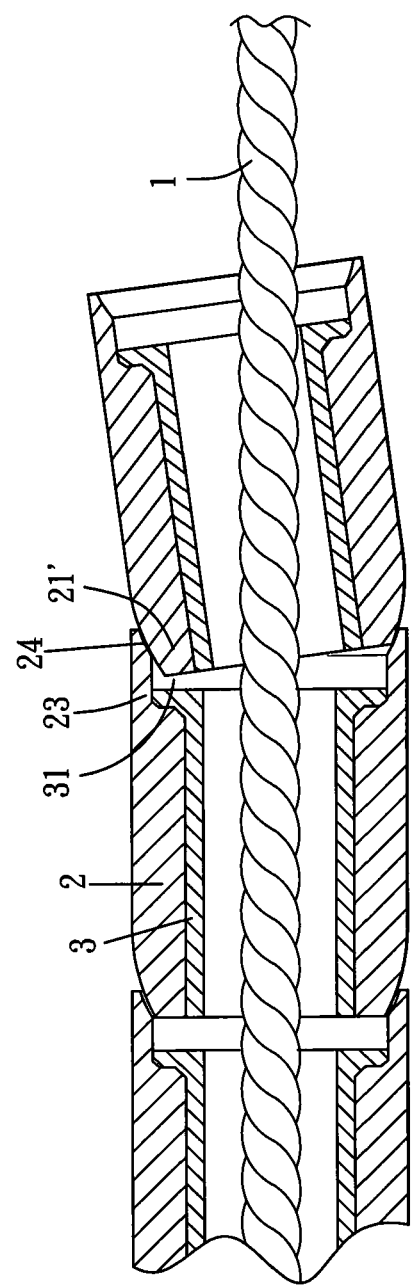
FIG. 10 is a schematic drawing of a cable sheath in accordance with an embodiment of the present invention.

Please refer to FIG. 10. an axial length of the fixed section 31 is smaller than an axial length of the abutting section 23, so that a spare space is formed inside of the abutting section 23 as the plastic inner tube 3 is inserted into the metal outer tube 2, as shown in FIG. 10. The spare space is provided to receive the head section 21' of another adapter tube when two of the adapter tubes are slantingly joined to each other. Thereby, a slant angle range between those joined adapter tubes is enlarged.

Accordingly, the invention can avoid the effect from the plastic tube of the cable, so that the invention and the cable inside will not be wound randomly by the plastic tube.

What is claimed is:

1. A cable sheath comprising plural adapter tubes, each of the adapter tubes having a first end and a second end, each of the adapter tubes comprising:
   a metal outer tube, formed with a head section, an extension section, an abutting section, and an end section from the first end to the second end, the extension section and the head section having a same inner diameter, an inner diameter of the abutting section being larger than the inner diameter of the extension section, an inner diameter of the end section being gradually enlarged from the abutting section toward the second end;
   a plastic inner tube, having a fixed section and a protective section which extends from the fixed section, an outer diameter of the fixed section corresponding to the inner diameter of the abutting section, an outer diameter of the protective section corresponding to the inner diameter of the head section and the extension section, the plastic inner tube being inserted into the metal outer tube from the end section so as to make the fixed section abut against the abutting section;
   wherein, the end section of each of the adapter tubes is adapted to be abutted against by the head section of another adapter tube;
   wherein, an axial length of the fixed section is smaller than an axial length of the abutting section, so that a spare space is formed inside of the abutting sectionsurface, the spare space is adapted to receive the head section of another adapter tube therein when two of the adapter tubes are slantingly joined to each other, so that a slant angle range between those joined adapter tubes is enlarged.

2. The cable sheath of claim 1, wherein a distal end of the protective section extends to the first end.

3. The cable sheath of claim 1, wherein an outer diameter of the abutting section and the end section are gradually enlarged toward the second end.

4. The cable sheath of claim 2, wherein an outer diameter of the abutting section and the end section are gradually enlarged toward the second end.

5. The cable sheath of claim 1, wherein an outer surface of the protective section fits an inner surface of the extension section and the head section.

6. The cable sheath of claim 1, wherein the outer diameter of the protective section is gradually contracted to a distal end of the protective section.

7. The cable sheath of claim 1, wherein a step surface is formed between the abutting section and the extension section, and the fixed section abuts against the step surface.

8. The cable sheath of claim 5, wherein a step surface is formed between the abutting section and the extension section, and the fixed section abuts against the step surface.

9. The cable sheath of claim 6, wherein a step surface is formed between the abutting section and the extension section, and the fixed section abuts against the step surface.

\* \* \* \* \*